United States Patent
Tsuie et al.

(10) Patent No.: US 7,733,951 B2
(45) Date of Patent: Jun. 8, 2010

(54) EQUALIZATION METHOD WITH ADJUSTABLE EQUALIZER SPAN

(75) Inventors: Yih-Ming Tsuie, Hsinchu (TW); Ming-Luen Liou, Taipei County (TW)

(73) Assignee: Mediatek Inc., Hsin-Chu (TW)

( * ) Notice: Subject to any disclaimer, the term of this patent is extended or adjusted under 35 U.S.C. 154(b) by 779 days.

(21) Appl. No.: 11/530,939

(22) Filed: Sep. 12, 2006

(65) Prior Publication Data
US 2008/0063042 A1   Mar. 13, 2008

(51) Int. Cl.
*H03H 7/30* (2006.01)
(52) U.S. Cl. ...................................... 375/233
(58) Field of Classification Search .................. 375/233
See application file for complete search history.

(56) References Cited
U.S. PATENT DOCUMENTS 6,735,248 B2   5/2004   Gu et al.
2004/0161029 A1*   8/2004   Malladi et al. ............... 375/232
2005/0129143 A1*   6/2005   Kang et al. .................. 375/316

* cited by examiner

*Primary Examiner*—Kevin Y Kim
(74) *Attorney, Agent, or Firm*—Thomas, Kayden, Horstmeyer & Risley (57) ABSTRACT

An equalization method receiving a received sample to generate an equalizer output. A channel profile is first provided, comprising a main path and a plurality of echoes distributed in time domain. Echoes anterior to the main path are precursors, and echoes posterior to the main path are postcursors. The received sample is filtered with a linear equalizer (LE) comprising a plurality of taps to generate an LE output. A slicer slices the equalizer output to generate a sliced sample. The sliced sample is further sent to a decision feedback equalizer (DFE) comprising a plurality of taps to generate a DFE output. Simultaneously, an equalizer span is determined based on the channel profile. The LE output and the DFE output are combined to generate the equalizer output having the equalizer span. The equalizer span is determined by allocating the position of main tap.

7 Claims, 10 Drawing Sheets

| Path loss | | Critical LEL span factor | Critical LER span factor | Maximum LEL span factor | Maximum LER span factor |
|---|---|---|---|---|---|
| Post-cursor | ~3dB | 6 | 3 | 8 | 4 |
| | 3~6dB | 3 | 2 | 5 | 2 |
| | 6~9dB | 2 | 1 | 2 | 1 |
| | 9~dB | 1 | 1 | 1 | 1 |
| Pre-cursor | ~3dB | 7 | 1 | 9 | 3 |
| | 3~6dB | 4 | 1 | 6 | 2 |
| | 6~9dB | 2 | 1 | 3 | 1 |
| | 9~dB | 1 | 1 | 2 | 1 |

EQUALIZATION METHOD WITH ADJUSTABLE EQUALIZER SPAN

BACKGROUND OF THE INVENTION

1. Field of the Invention

The invention relates to digital television system, and in particular, to decision feedback equalizers with adjustable equalizer span.

2. Description of the Related Art

Figure 1:
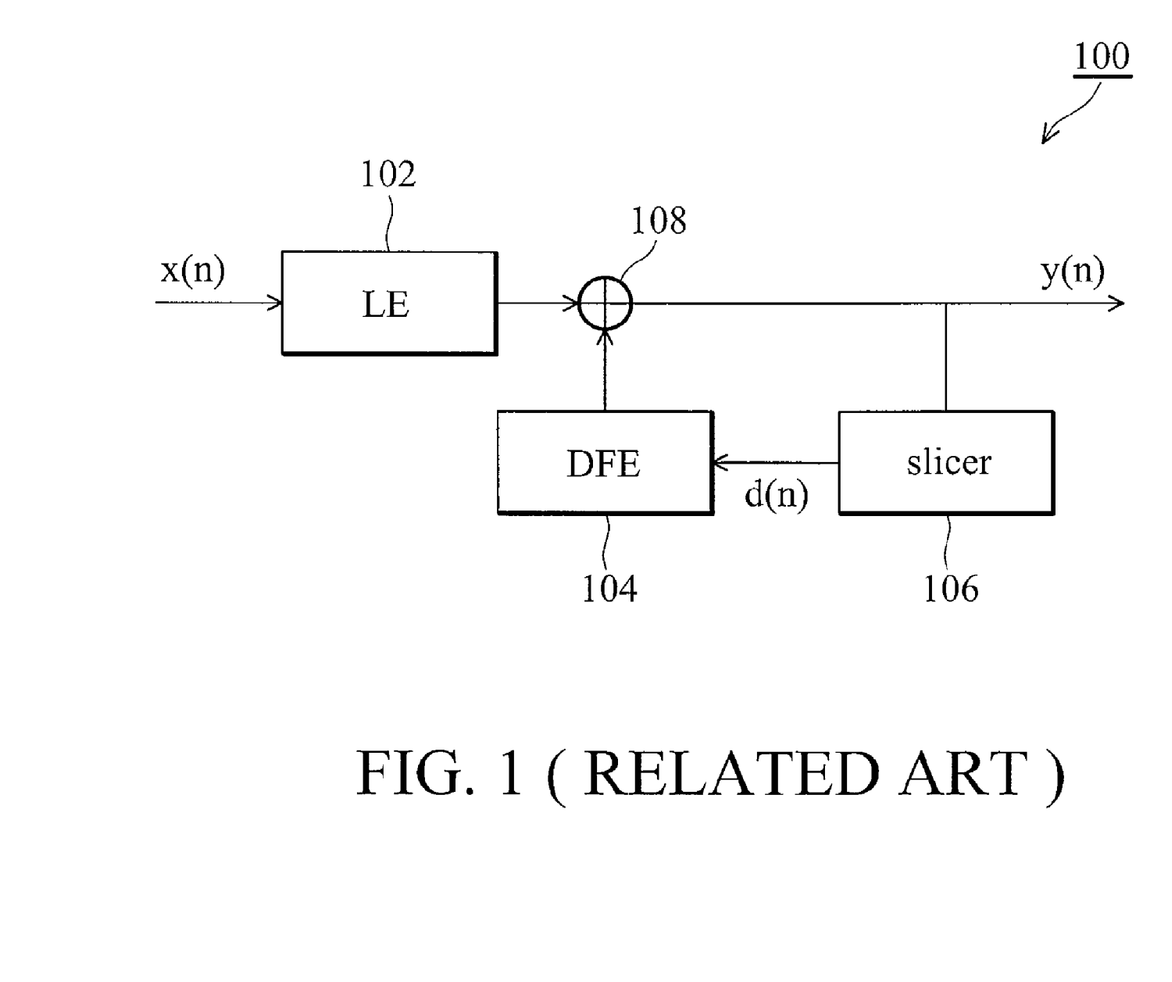
FIG. 1 shows a conventional decision feedback equalizer.

FIG. 1 shows a conventional decision feedback equalizer. Received sample x(n) denotes a sampled symbol corresponding to time n. The linear equalizer (LE) 102 filters the received sample x(n) to generate part of the equalizer output y(n). A slicer 106 slices the equalizer output y(n) to generate a sliced sample d(n), and the decision feedback equalizer (DFE) 104 filters the sliced sample d(n) to contribute the equalizer output y(n) by an adder 108. The linear equalizer 102 and decision feedback equalizer 104 each comprises a delay line formed by a plurality of taps, and the received sample x(n) and sliced sample d(n) shifting in the delay lines are multiplied with coefficients to generate the equalizer output. The coefficients are also recursively updated by another algorithm such as the least-mean-square (LMS) algorithm. This architecture is typical and widely known, and detailed implementation varies with application.

Figure 2:
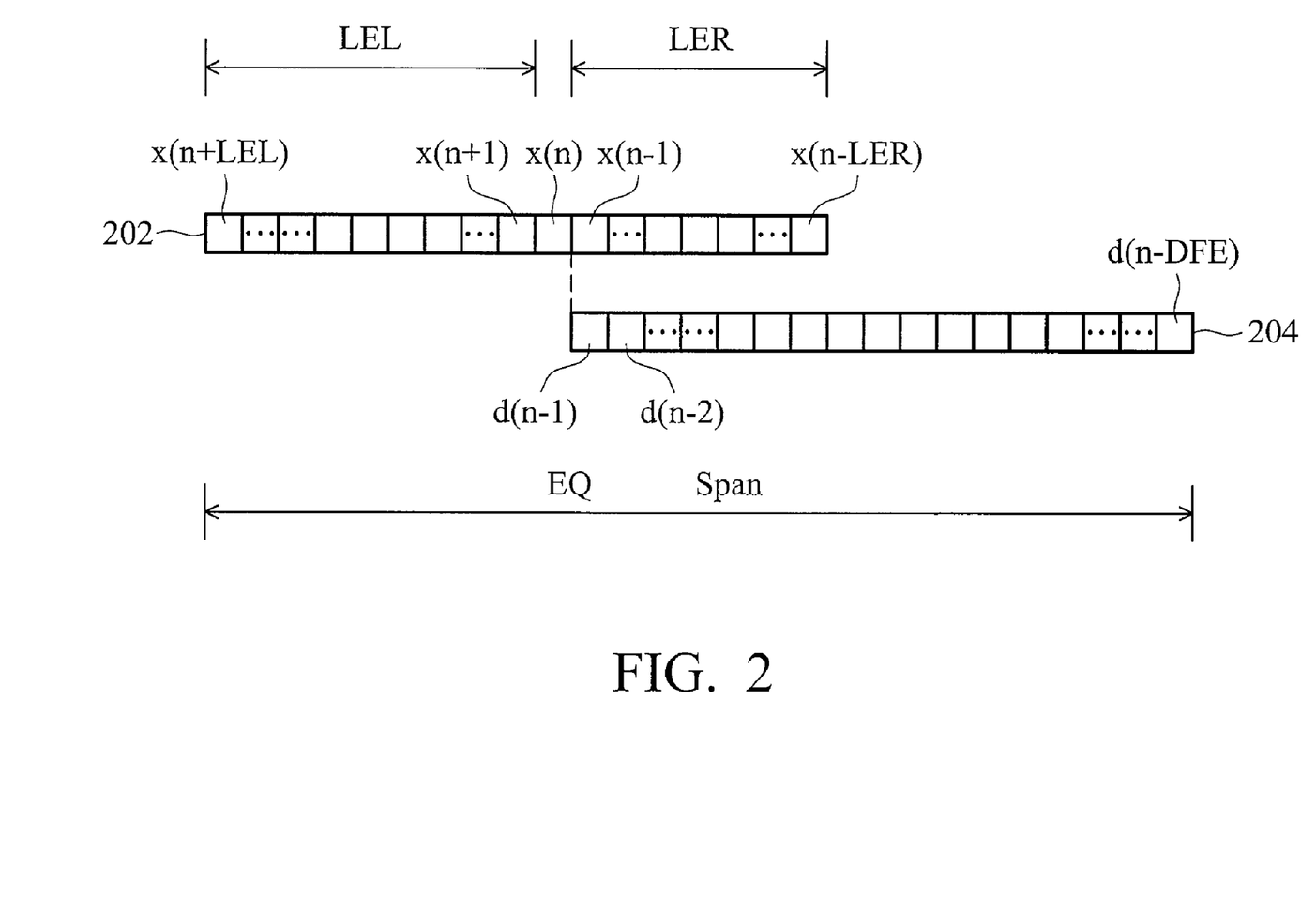
FIG. 2 shows an equalizer span formed by linear equalizer taps and decision feedback equalizer taps.

FIG. 2 shows an equalizer span formed by linear equalizer taps and decision feedback equalizer taps. Each tap in the LE delay line 202 stores a sample value. The tap storing received sample x(n) is referred to as the main tap. Number of taps anterior to the main tap is LEL, and number of taps posterior to the main tap is LER. An equalizer output y(n) is the combination of the LE delay line 202 output and the DFE delay line 204 output, expressed as:

$$y(n) = \sum_{k=-LEL}^{LER} f_k x(n-k) + \sum_{k=1}^{DFE} b_k d(n-k) \quad (1)$$

Where LEL is the number of taps anterior to the main tap, and DFE is the number of DFE delay line 204 taps. The LEL and DFE are predetermined numbers, and the equalizer span is equal to LEL+DFE+1. $f_k$ and $b_k$ are coefficients of the linear equalizer 102 and decision feedback equalizer 104, respectively.

Since the channel conditions are unpredictable, a predetermined main tap allocation scheme, which corresponds to a fixed equalizer span, may not always render good SNR results. Dynamic main tap allocation methods have been proposed. However, some methods require significant computation resources, making the hardware implementations unacceptable. Therefore a more efficient improvement is desirable.

BRIEF SUMMARY OF THE INVENTION

A detailed description is given in the following embodiments with reference to the accompanying drawings.

An exemplary embodiment of an equalization method is provided, receiving a received sample to generate an equalizer output. A channel profile is first provided, comprising a main path and a plurality of echoes distributed in time domain. Echoes anterior to the main path are precursors, and echoes posterior to the main path are postcursors. The received sample is filtered with a linear equalizer (LE) comprising a plurality of taps to generate an LE output. A slicer slices the equalizer output to generate a sliced sample. The sliced sample is further sent to a decision feedback equalizer (DFE) comprising a plurality of taps to generate a DFE output. Before performing the channel equalization, the equalizer span is determined based on the channel profile. The LE output and the DFE output are combined to generate the equalizer output, the coped result of echoes within the equalizer span. The equalizer span is determined by allocating the position of main tap, and the main tap is determined from the channel profile information provided by the timing synchronization module in the receiver.

The echoes are categorized into a plurality of groups based on their path losses relative to the main path strength, with the group distances recorded; wherein a group distance represents distance, measured in symbol periods, between the main path and the farthest echo of a group. A lookup table storing span factors of each group, is applicable for the linear equalizer to reduce the echoes of each group to a predetermined level. The lookup table is consulted to obtain the span factor corresponding to each group, and tap requirements are calculated from multiplications of the span factors and corresponding group distances. The $i^{th}$ tap in the linear equalizer is then determined as the main tap based on the tap requirements. In this way, the equalizer span consists of the former i linear equalizer taps and a total of DFE filter taps.

Specifically, the categorization generates precursor groups for precursor echoes, and postcursor groups for postcursor echoes. The calculation of tap requirements comprises determining a maximum left tap number (maximum LEL) and a maximum right tap number (maximum LER) from span factors of the precursor and postcursor groups, sufficient to reduce all echoes to a negligible level. A critical left tap number (critical LEL) and a critical right tap number (critical LER) are also determined from span factors of the precursor and postcursor groups, sufficient to reduce all echoes to an acceptable level. As for the terms mentioned above, the separation range of each group is 3 db; the negligible level means a residual echo, which is due to the compensation of the equalizer, with path loss of at least 20 db, and the acceptable level means a residual echo with path loss of at least 15 db.

The philosophy behind the span adjustment scheme can be summarized as follows. First of all, we will perform an initial LE allocation scheme to determine the optimal LEL and LER. After that, we will perform an LE allocation check scheme: If the sum of the farthest group distance and LER exceeds the DFE, we will shift right the main-tap to reduce LER until this situation stops. In the initial LE allocation scheme, we try to meet the LEL requirement since LEL plays an important role in combating the precursor echoes. In the LE allocation check scheme, we try to control the LER so that the resulted postcursor echoes, which are due to the convolution of the transmission channel and the LE, are still reachable by the DFE.

The initial LE allocation scheme is further divided into two sub-schemes. The first sub-scheme is used to set the main-tap by meeting the LEL requirements, while the second sub-scheme will adjust the main-tap by examining the LER requirements. In the first sub-scheme, if the sum of maximum left and right tap numbers exceeds the capacity of linear equalizer, the taps of linear equalizer will be allocated while sufficient for the critical left tap number (critical LEL); if the LE taps are still not enough for critical LEL, the main tap will be assigned at the rightmost tap of the linear equalizer. This means that except for the rightmost tap, all the LE taps are used to combat the precursor echoes. When the capacity of linear equalizer is sufficient for the LEL requirement, the main tap will be assigned at the (LEL+1)$^{th}$ tap counting from leftmost tap of the linear equalizer, and the rest (right tap number) will be allocated as the LER taps.

After allocating the main tap from the first sub-scheme, number of the linear equalizer taps successive to the main tap is counted as a right tap number. Among the critical right tap number (critical LER) and the maximum right tap number (maximum LER), the one nearest the right tap number and not exceeding the right tap number, is selected as the LER requirement of the second sub-scheme. When this happens, it means that we need fewer taps for the LER. The excess taps will be added to the LEL, and now the main-tap will be assigned at the $(LER+1)^{th}$ tap counting from the rightmost tap of the linear equalizer. If neither critical LER nor maximum LER is selected, the right tap number is then taken as the LER requirement of the second sub-scheme. In this situation, no main tap re-assignment is required.

After the initial LE allocation scheme, the LE allocation check scheme is performed to ensure that the entire scheme will not produce resulted postcursor echoes that outside the covered range of the DFE. Since the channel seen by the DFE is the convolution result of the transmission channel and the linear equalizer, the distance of the farthest postcursor echo will be the sum of LER and the farthest group distance. If this sum value is larger than the DFE, there will be residual postcursor echoes beyond the scope of the DFE and therefore causing some inter-symbol-interference (ISI) effect. To prevent this problem, if the sum value is larger than DFE, we can reduce the LER requirement through shifting the main-tap to the right by the amount of taps which equals the difference between the sum value and DFE.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
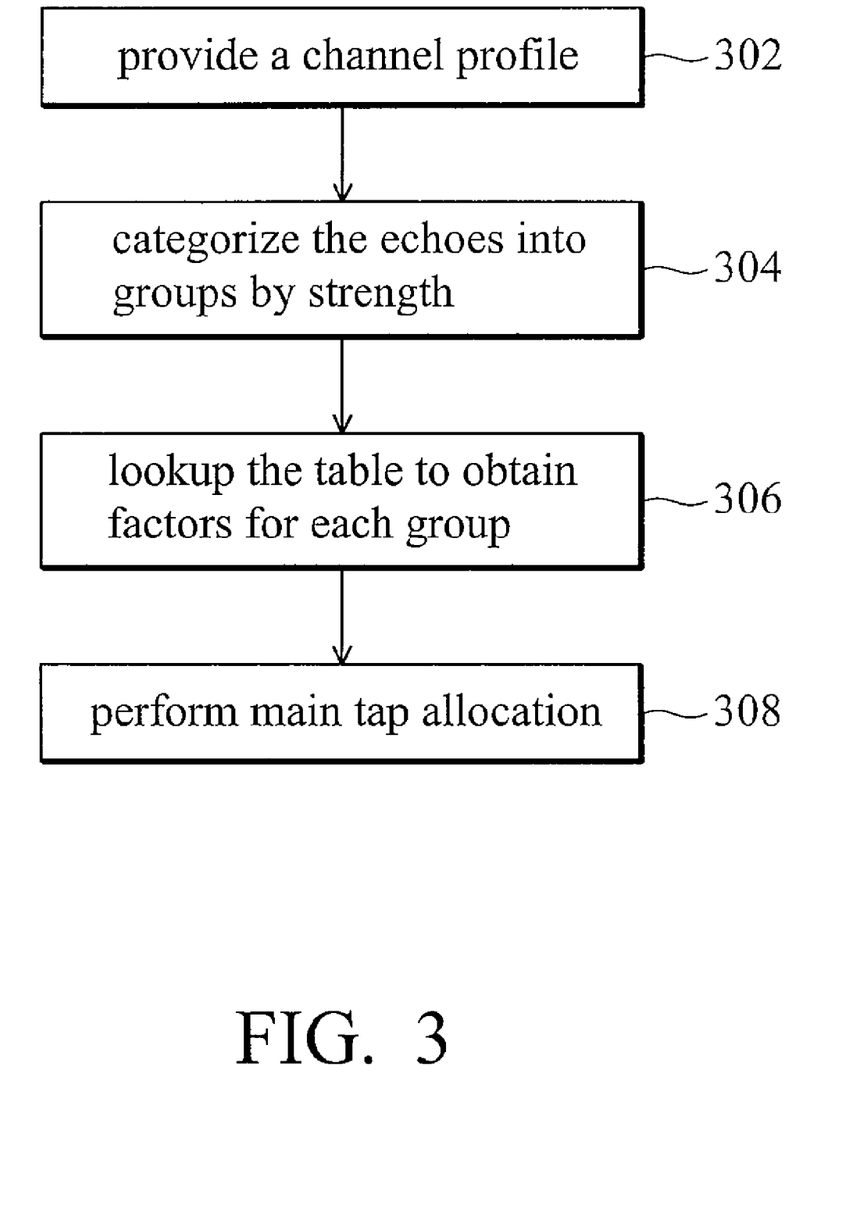
FIG. 3 is a flowchart of equalizer span determination.

FIG. 3 is the flowchart for equalizer span determination. In the embodiment, the equalizer span is adjustable based on channel characteristics. In step 302, a channel profile is estimated, comprising a plurality of echoes and a main path. The channel estimation and main path identification may be accomplished in conventional fashion. For example, the channel estimation is derived from training signals using various correlation operations. In the ASTC system, the training signals include field sync symbols. In the channel profile, echoes anterior to the main path are referred to as precursors, whereas those posterior to the main path are postcursors. In step 304, the echoes are grouped by strength. Specifically, the echoes are categorized according to their path losses, strength ratios of the echoes to the main path. For example, echos having path loss from 3 dB to 6 dB are categorized into a group, and those with 6 dB to 9 dB path loss into another group. An echo with 3 dB path loss means that its power is 50% that of the main echo. Distances from each echo to the main path are also considered. For example, a group distance represents distance between the main path and the farthest echo of that group. Therefore, a list may be established to identify the group path loss and group distance. Additionally, in the embodiment, a lookup table is provided, storing span factors of each group, by which the linear equalizer can reduce the residual inter-symbol interference (ISI) caused by the echoes of each group to predetermined levels. For example, for a group of 3 dB to 6 dB, the span factor required to reduce the echo strength to at least 15 dB is 4. As another example, in a group of 6 dB to 9 dB, the span factor may be at least 3 to reduce the echo strength to below 20 dB. In step 306, span factors for each group are obtained from the lookup table for calculating tap requirements for the linear equalization. For each group, the corresponding span factor is multiplied with its group distance, and the result is the tap number required for the group. In step 308, the main tap allocation can be further processed based on the calculated tap requirements for each group.

Figure 4:
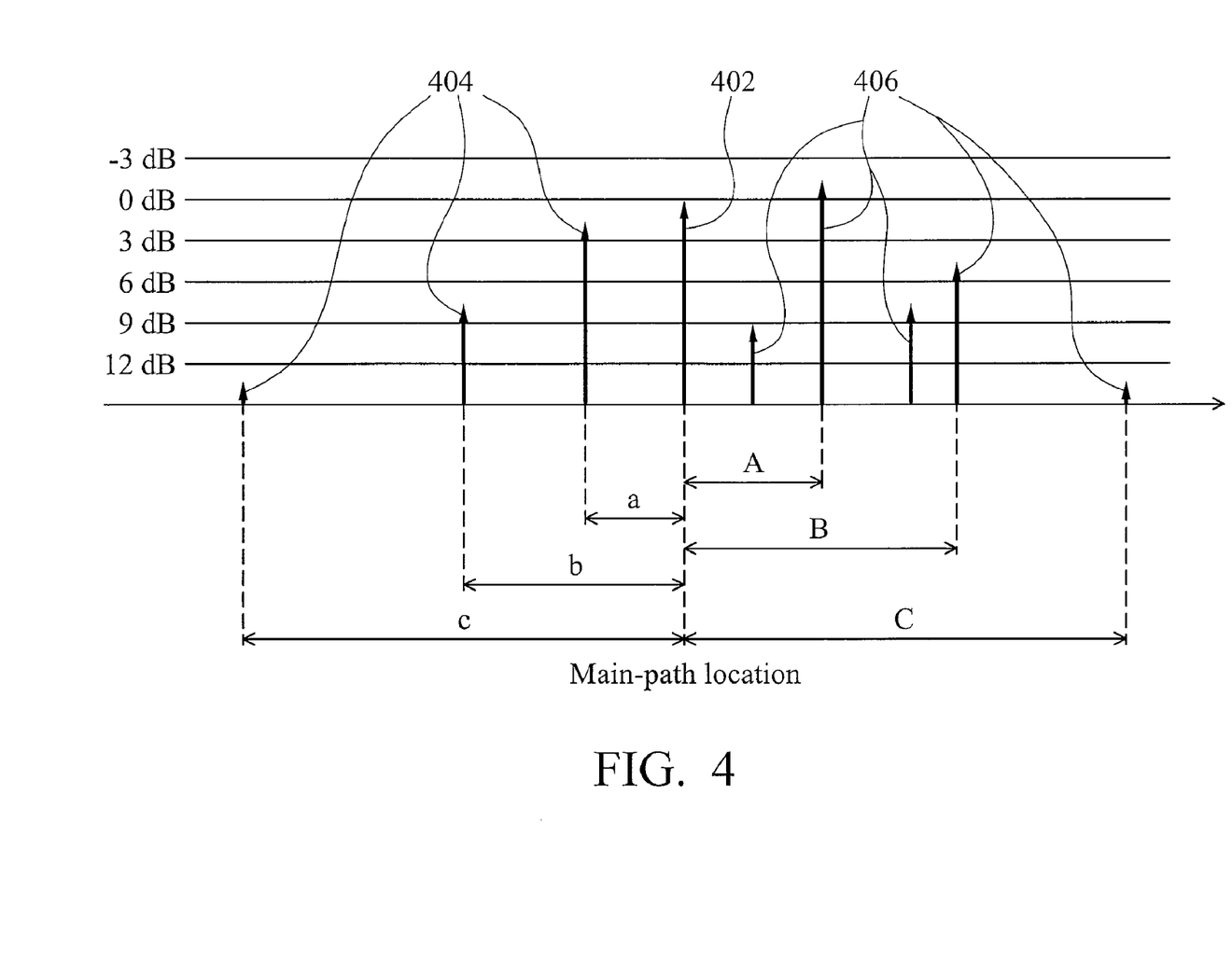
FIG. 4 shows an embodiment of echo categorization.

FIG. 4 shows an embodiment of echo categorization. A channel profile comprises a main path 402, a plurality of precursors 404, and a plurality of postcursors 406. The main path may not necessarily be the strongest echo in the channel profile, and the determination thereof may be accomplished by various known methods, thus detailed description is omitted herefrom. The echo strengths are categorized relative to the main path with separation range of 3 dB. The precursors and postcursors are separately categorized into precursor groups and postcursor groups. For example, the precursors 404 are categorized into three precursor groups: 0 dB to 3 dB, 6 dB to 9 dB, and 12 dB below. In each precursor group, the distance between the farthest echo and the main path, referred to as a group distance, is also recorded, as denoted as a, b and c in FIG. 4. This categorization simplifies the channel profile analysis, facilitating estimation of tap requirements.

Figure 5:
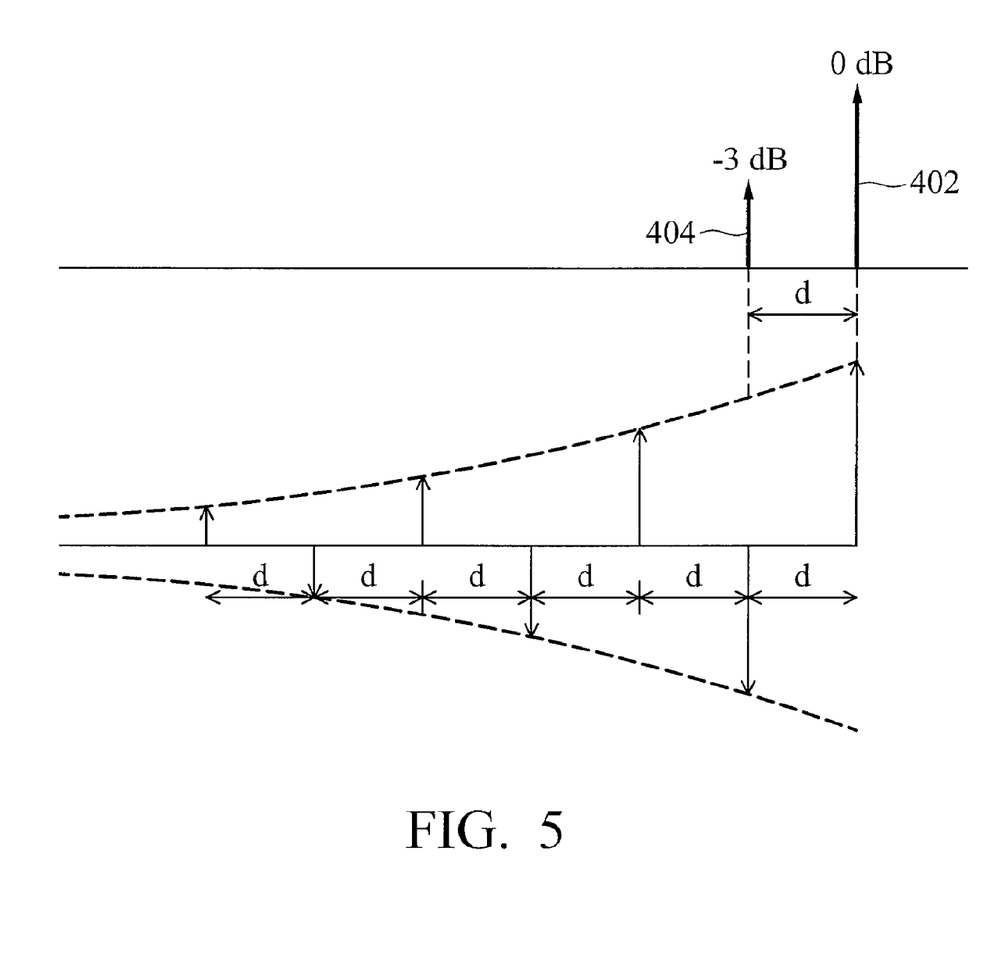
FIG. 5 shows an embodiment of span factor determination.

FIG. 5 shows an embodiment for span factor determination. As an example, a precursor 404 of 3 dB path loss and the main path 402 are shown. The distance (in terms of symbol period), is d, representing latency relative to the main path in time domain. The echo can be mitigated by convolving the channel with a finite impulse response (FIR) filter, This is, in effect, equivalent to filtering the channel distorted signal by this FIR filter. The span factor determines the extent of the echo elimination. In this embodiment, if the 3 dB path loss echo is to be reduced to a 15 dB residual one, the precusrsor span requirement of the filter (the linear equalizer) should be at least 4 times the distance d. That is, the taps of the FIR filter should be at least (4d+1). In the above statement, 4 is called the span factor for this precursor echo, and the extra 1 in the parenthesis is for the main tap. If we intend to mitigate this 3 dB echo into a residual one with 20 dB path loss, the span factor should be 6. Likewise, span factors for different path loss can be defined according to different SNR requirements, and a lookup table can be established thereby. Tap requirement for mitigating an echo group can therefore be directly derived from the multiplication of the span factor and the group distance.

Figure 6:
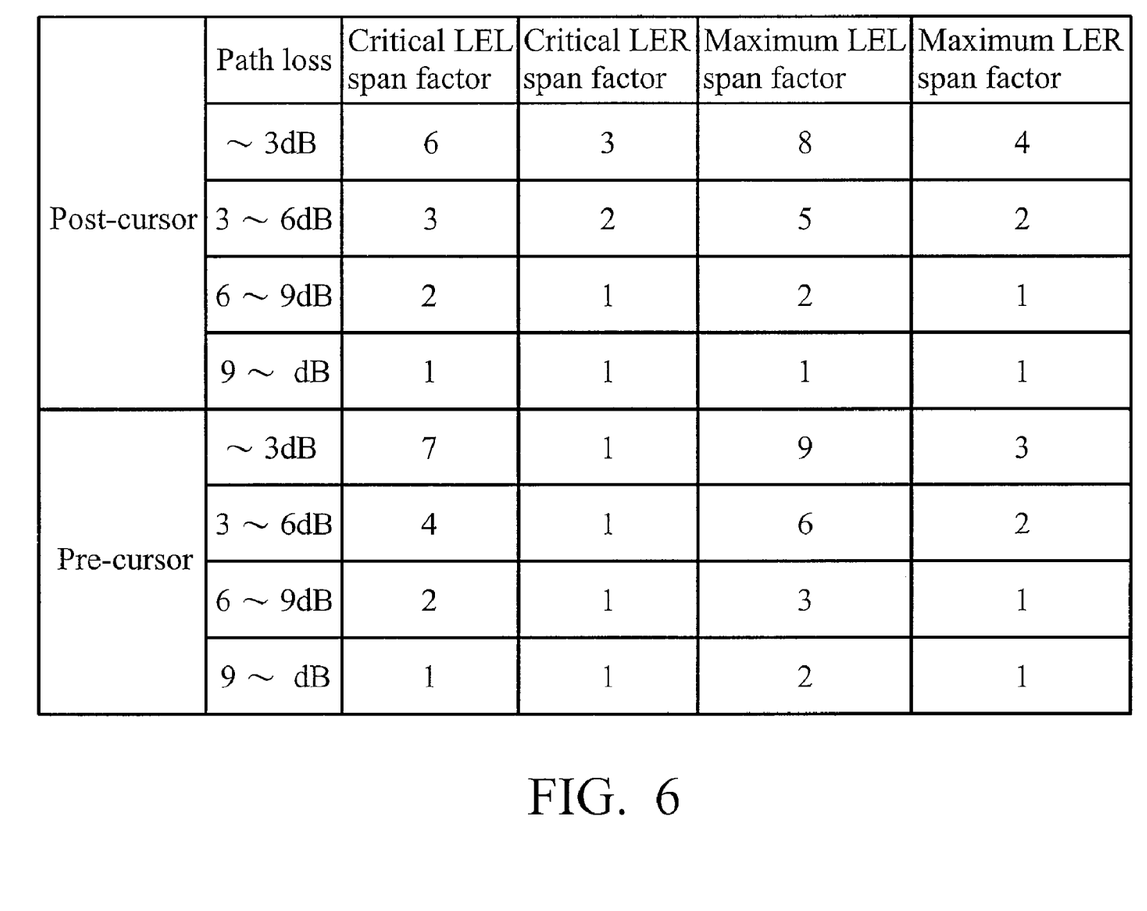
FIG. 6 shows an embodiment of a lookup table.

FIG. 6 shows an embodiment of a lookup table. In this embodiment, path loss is divided into four levels, and span factors are defined by two different requirements, critical and maximum factors. The critical factors are used for mitigating the echoes to acceptable levels (about 15 dB path loss), while the maximum factors are used for mitigation to negligible levels (around 20 dB path loss). The invention is aimed for decision feedback channel equalization. Due to the existence of the decision feedback part, the span factor for mitigating a postcursor echo will be smaller than that for mitigating a precursor echo with the same strength. Furthermore, under the structure of decision feedback equalization, except for the proper LEL taps, some LER taps will be required to achieve better results when compensating a precursor echo, and vice versa for compensating a postcursor echo. Thus, the table lists postcursor groups and precursor groups separately, and each group is related to 4 span factors, namely, Critical LEL span factor, Critical LER span factor, Maximum LEL span factor, and Maximum LER span factor. The critical factors of LEL and LER are sufficient to reduce corresponding echoes (precursors or postcursors) to an acceptable level, for example, 15 dB in this embodiment. The maximum factors of LEL and LER reduce the echoes to a negligible level, such as 20 dB. The derivation of span factors is programmable, thus the decision feedback equalizer can be flexibly implemented for various SNR requirements. The lookup table may further provide other factors to satisfy different SNR requirements, and the implementation can be variable. For example, the tap requirement determination can be a combination of multiplications of various factors and group distances, such that flexibility and programmability are not constrained by the embodiment.

Figure 7A:
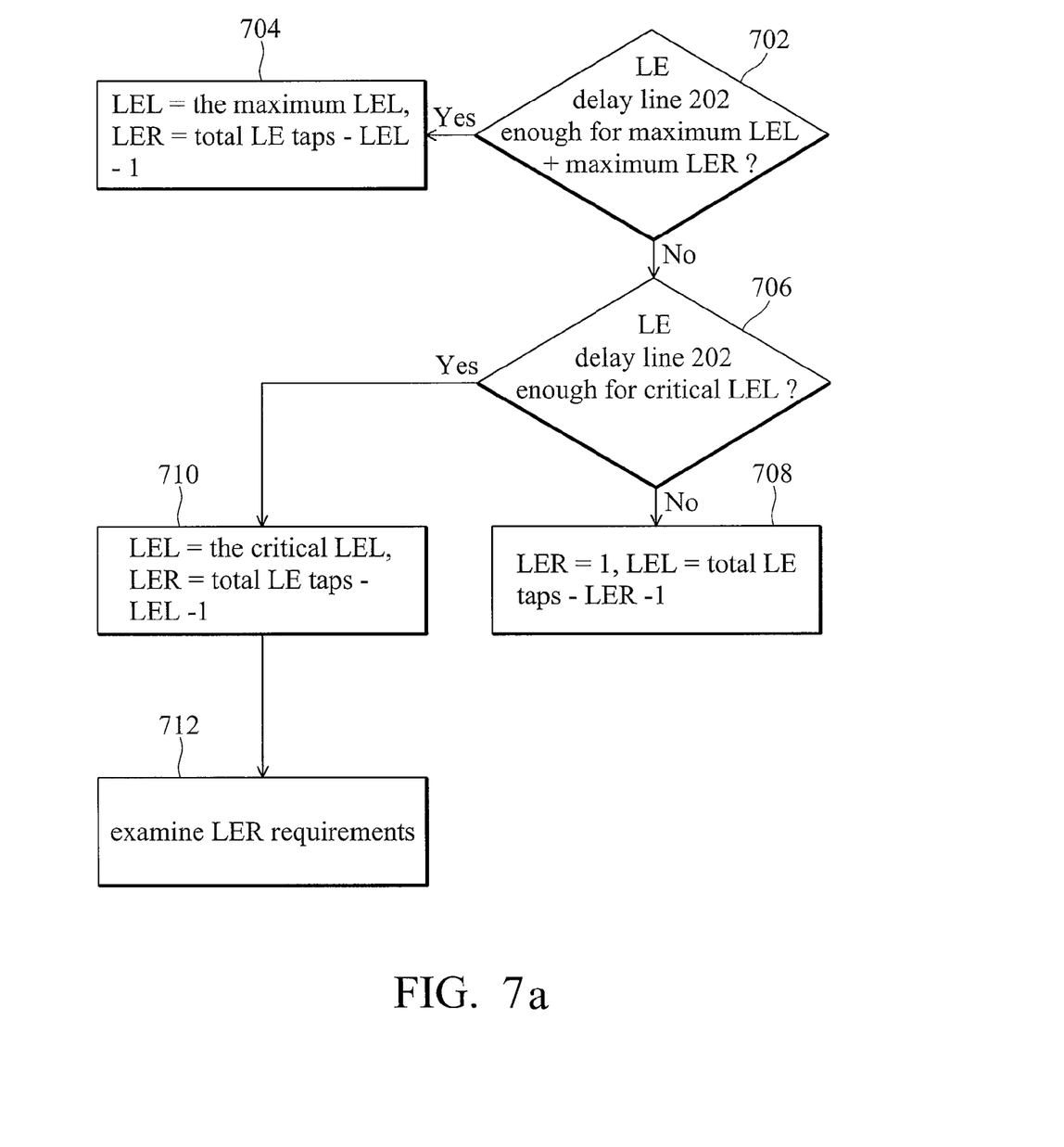
FIGS. 7a and 7b are flowcharts of the first and second sub-scheme of the initial LE allocation scheme.
Figure 7B:
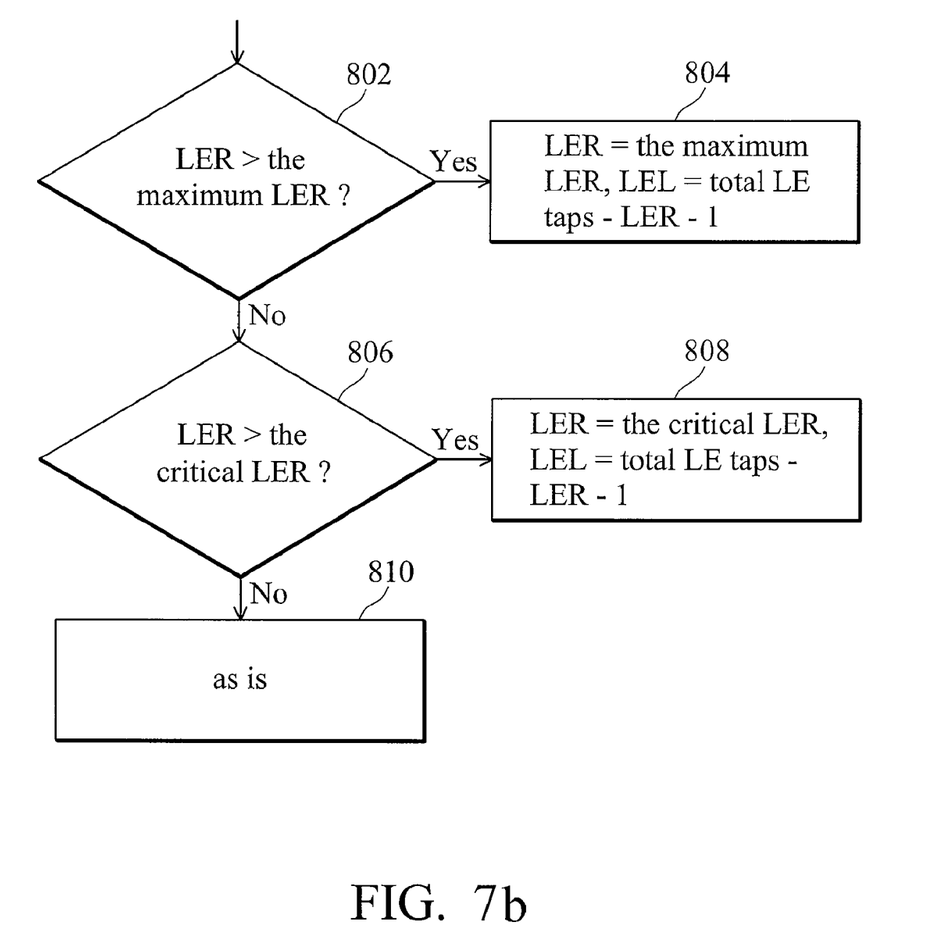

FIGS. 7a and 7b are flowcharts of the sub-schemes for the initial LE allocation. Using the lookup table in FIG. 6, four tap requirements are respectively obtained as parameters, maximum LEL and LER for precursor and postcursor groups, critical LEL and LER for precursor and postcursor groups. Since the number of linear equalizer taps is limited, the maximum requirement is first checked if satisfiable, and if not, the critical requirement is then checked. In step 702, the capacity of LE delay line 202 is examined if sufficient for the sum of maximum LEL and LER. If the sum of maximum LEL and LER does not exceed the capacity of LE delay line 202, the process goes to step 704, in which the main tap is allocated by the maximum LER counting from right end of the linear equalizer. That is to say, the LER is set to the maximum LER, and the LEL is set to be the rest taps excluding the main tap. Otherwise, the process goes to step 706, checking whether the capacity of LE delay line 202 is sufficient for the critical LEL. If not, step 708 is processed, in which the main tap is allocated to be the rightmost tap of the linear equalizer. In this case, the LER is 0, and the LEL is the rest taps excluding the main tap. Conversely, if the capacity of linear equalizer is sufficient to serve the critical LEL, the process goes to step 710, and the main tap is allocated by the critical LEL counting from left end of the linear equalizer. That is to say, the LEL is set to be the critical LEL, and the LER is the rest taps excluding the main tap. After step 710, we enter the second sub-scheme, a reallocation may be performed based on the rest LER in step 712 to further balance the equalization of precursors and postcursors.

FIG. 7b shows detailed steps in step 712. Since the main tap is allocated in step 710 to satisfy left tap requirement, the right tap requirement is further diagnosed. As denoted in FIG. 2, the number of taps successive to the main tap is LER. In step 802, the LER is compared with the maximum LER. If the LER exceeds the maximum LER, the main tap is reallocated by the maximum LER from right end of the linear equalizer in step 804. That is to say, the LER is set as the maximum LER, and the LEL is set as the rest taps excluding the main tap. Conversely, step 806 is processed, checking whether the LER exceeds the critical LER. If so, the process goes to step 808, reallocating the equalizer span by setting the LER to the critical LER, and the main tap and LEL are also causally altered. Otherwise, step 810 is processed, and the original allocation remains as is.

Figure 8A:
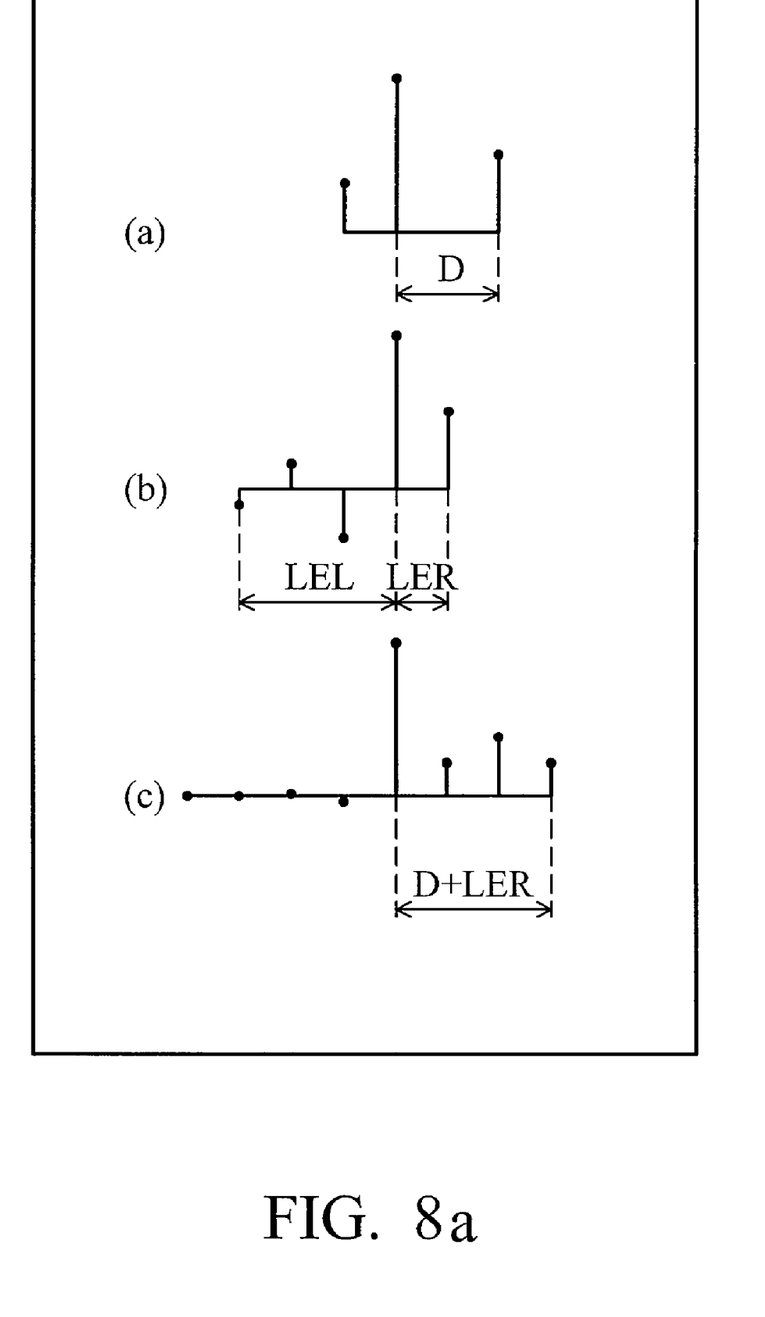
FIG. 8a shows a channel profile before and after linear equalization.
Figure 8B:
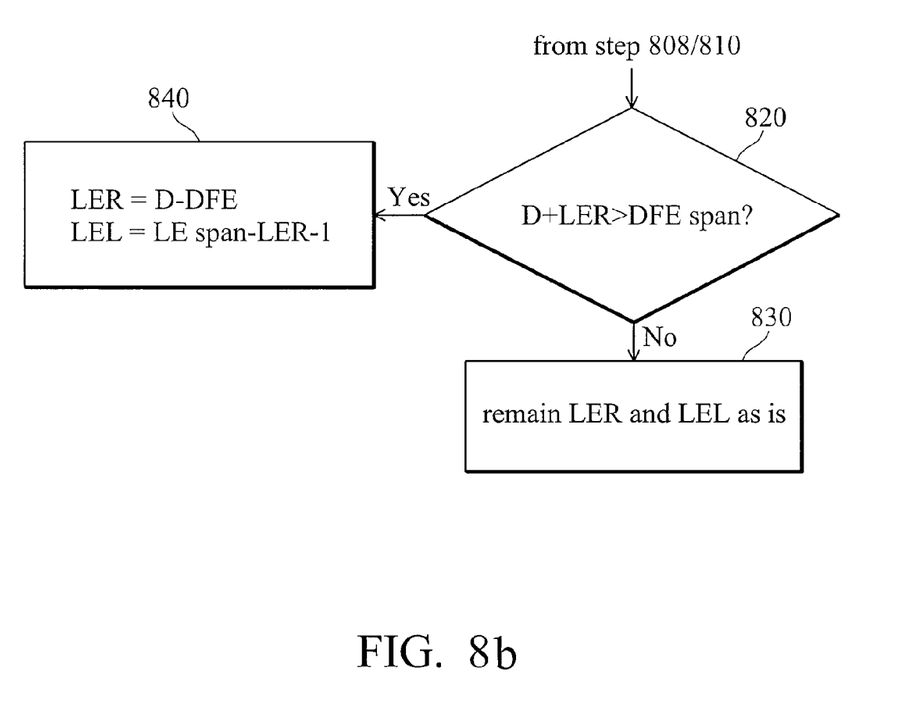
FIG. 8b is a flowchart of a further confirmation for the DFE span.

FIG. 8a shows a channel profile before and after linear equalization. For a decision-feedback based system comprising a linear equalizer 102 and a decision feedback equalizer 104, a channel profile seen by the linear equalizer 102 is shown in FIG. 8a(a), having a farthest postcursor group distance D. The feed forward part may comprise coefficients shown in FIG. 8a(b), with LEL and LER configured. The causal part of channel profile seen by the decision-feedback part is the convolution result of the channel profile with the coefficients of the feed forward part, as shown in FIG. 8a(c). It can be seen that precursors in the channel profile have been effectively eliminated, with extended postcursors induced equal to D+LER. The tap number of the decision feedback equalizer 104, might be insufficient for the extended postcursors. If the DFE span in the decision feedback equalizer 104 can not cover the extended postcursors D+LER, ISI will be induced, degrading the system performance. Therefore, an LE allocation check scheme is required to prevent the farthest postcursor group distance D+LER from exceeding the DFE span. FIG. 8b is a flowchart of a further confirmation for the DFE span. In step 820, the extended postcursor channel span is checked whether exceeding the DFE span of the decision feedback equalizer 104. If so, the previously allocated LER is reduced by the excess amount in step 840, and the LEL and main-tap are accordingly adjusted. Else in step 830, the previous main tap allocation is remained as is.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An equalization method, receiving a received sample to generate an equalizer output, comprising:

providing a channel profile comprising a main path and a plurality of echoes distributed in time domain, wherein echoes anterior to the main path are precursors, and echoes posterior to the main path are postcursors;

filtering the received sample with a linear equalizer (LE) comprising a plurality of taps to generate an LE output;

slicing the equalizer output to generate a sliced sample;

filtering the sliced sample with a decision feedback equalizer (DFE) comprising a plurality of taps to generate a DFE output;

determining an equalizer span based on the channel profile; and combining the LE output and the DFE output to generate the equalizer output having the equalizer span;

categorizing the echoes into a plurality of groups based on their path loss, with group distances of each group recorded; wherein a group distance represents distance between the main path and the farthest echo of a group;

providing a lookup table storing the span factors of each group, applicable for the linear equalizer to reduce the echoes of each group to a predetermined level;

consulting up the lookup table to obtain the span factors of each group;

calculating tap requirements from multiplications of the span factors and corresponding group distances; and allocating an ith tap in the linear equalizer as a main tap based on the tap requirements; wherein the equalizer span consists of the former i linear equalizer taps and a total of DFE filter taps.

2. The equalization method as claimed in claim 1, wherein:

the categorization generates precursor groups for precursors, and postcursor groups for postcursors;

calculation of tap requirements comprises:

determining a maximum left tap number and a maximum right tap number from the span factors of the precursor and postcursor groups, sufficient to reduce all echoes to a minimum level;

determining a critical left tap number and a critical right tap number from the span factors of the precursor and postcursor groups, sufficient to reduce all echoes to a negligible level; and determination of the equalizer span comprises, if the sum of maximum left and right tap numbers does not exceed the capacity of linear equalizer, allocating the main tap by the maximum right tap number counting from right end of the linear equalizer.

3. The equalization method as claimed in claim 2, wherein determination of equalizer span further comprises:

if the sum of maximum left and right tap numbers exceeds the capacity of linear equalizer, determining whether the capacity of linear equalizer is sufficient for the critical left tap number; and if the capacity of linear equalizer is not sufficient for the critical left tap number, allocating the main tap to the rightmost tap of the linear equalizer.

4. The equalization method as claimed in claim 3, wherein determination of equalizer span further comprises if the capacity of linear equalizer is sufficient for the critical left tap number, allocating the main tap by the critical left tap number counting from left end of the linear equalizer.

5. The equalization method as claimed in claim 4, wherein determination of equalizer span further comprises, after allocating the main tap:

calculating number of the linear equalizer taps successive to the main tap as a right tap number; and selecting one of the critical right tap number and the maximum right tap number based a condition: the one nearest the right tap number and not exceeding the right tap number; wherein if the condition is not met, the right tap number is selected; and reallocating the main tap allocation by the selected number counting from right end of the linear equalizer.

6. The equalization method as claimed in claim 5, wherein determination of equalizer span further comprises, after reallocating the main tap:

filtering the channel profile by the linear equalizer to generate a filtered channel profile having an extended postcursor span equal to a farthest postcursor group distance plus the right tap number;

determining whether the extended postcursor span exceeds the total of DFE filter taps;

If the extended postcursor span exceeds the total of DFE filter taps, the right tap number is assigned to be the amount of the extended postcursor span subtracting the DFE filter taps; and the main tap is further reallocated by the decreased right tap number counting from right end of the linear equalizer.

7. The equalization method as claimed in claim 2, wherein:

the separation range of each group is 3 dB;

the acceptable level is an echo path loss of 15 dB; and the negligible level is an echo path loss of 20 dB.

* * * * *